United States Patent [19]
Wohl et al.

[11] 3,794,729
[45] Feb. 26, 1974

[54] INHIBITING BLOOD PLATELET AGGREGATION

[75] Inventors: Arnold J. Wohl, North Caldwell; Peter J. Daniels, Cedar Grove; John G. Topliss, West Caldwell, all of N.J.

[73] Assignee: Schering Corporation, Bloomfield, N.J.

[22] Filed: July 16, 1971

[21] Appl. No.: 163,460

Related U.S. Application Data

[63] Continuation-in-part of Ser. No. 811,200, March 27, 1969, abandoned.

[52] U.S. Cl.............. 424/337, 424/225, 424/312, 424/313, 424/317

[51] Int. Cl............................................ A61k 27/00
[58] Field of Search.... 424/337, 317, 312, 313, 225

[56] References Cited
UNITED STATES PATENTS
3,383,421   5/1968   Fox et al............................ 260/607

Primary Examiner—Sam Rosen
Attorney, Agent, or Firm—Bruce M. Eisen; Stephen B. Coan

[57] ABSTRACT

The inhibition of undesirable blood-platelet aggregation by administration of novel pharmaceutical preparations comprising certain polyiodo- or bromo- oxydiphenyl sulfones.

22 Claims, No Drawings

INHIBITING BLOOD PLATELET AGGREGATION

This application is a continuation-in-part of Ser. No. 811,200 filed Mar. 27, 1969, now abandoned.

Blood-platelets, sometimes referred to as thrombocytes, are bodies which exist in large numbers in normal mammalian blood and form a vital part of the complex hemostatic mechanism. These blood-platelets aggregate or clump during the course of normal clot formation or coagulation in response to bleeding. Conditions are recognized, however, in which blood-platelets aggregate when the normal clotting response is not desired. Such undesirable intravascular coagulation appears to play an important role as an etiologic or complicating factor in a large numbeer of disease states. While controversy continues as to the causal role of blood-platelet aggregation in atherosclerosis, it is accepted that such platelet aggregation accelerates the narrowing and eventual closure of the vascular lumen begun by the atherosclerotic plague.

One important factor involved in this pathological (thrombocytopathic) phenomenon is abnormal or excessive blood platelet adhesiveness or stickiness. Regardless of the mechanism involved, it is generally conceded that platelet adhesiveness plays a critical role in the formation of thrombi from flowing blood and in myocardial infarction. While it is not experimentally feasible to duplicate natural or endogenous thrombus formation, it is generally believed that if this tendency toward undesired platelet aggregation or adhesiveness could be reduced, the incidence of thrombosis and myocardial infarction could be reduced.

We have now discovered certain pharmaceutical preparations which tend to reduce or combat such undesirable blood platelet aggregation without serious impairment of the hemostatic defense system. These pharmaceutical preparations, in dosage unit form adopted for administration to obtain an inhibitory effect on blood-platelet aggregation, comprise per dosage unit, a non-hemolytic amount within the range of from about 30 to about 800 milligrams of a polyiodo- or bromo-hydroxydiphenyl sulfone, or a pharmaceutically acceptable salt, ether or ester thereof in a pharmaceutical diluent. These sulfones, in their free phenolic form, can be structurally represented as follows:

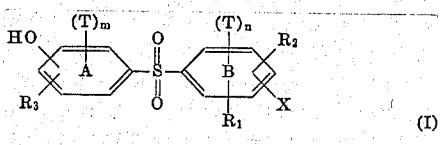

(I)

wherein each T is independently iodine or bromine and $m$ has a value of 1 or 2 and $n$ has a value of 0, 1 or 2 with the proviso that $m + n$ is at least 2 and $m$ is at least equal to $n$; X is hydroxy or halogen and $R_1$, $R_2$ and $R_3$ are independently selected from the group consisting of hydrogen, halogen, trifluoromethyl and alkyl radicals having 1 to 4 carbon atoms.

In a preferred subclass of compounds for use in the compositions of this invention, the A ring is a 3,5-di-T-4-oxy moiety, and particularly the 3,5-diiodo-4-oxy moiety. This subclass can be represented structurally as

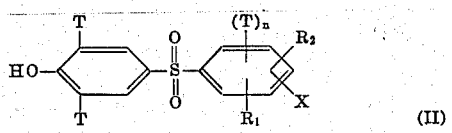

(II)

wherein T, $R_1$, $R_2$ and $n$ are as above defined, and the pharmaceutically acceptable salts, ethers and esters thereof. In a further preferred embodiment of formula II, T is iodo, as exemplified by the disodium salts of 3,3'-,5,5'-tetraiodo-2,4'-dihydroxydiphenylsulfone and 3,-3',5-triiodo-4,4'-dihydroxy-diphenylsulfone.

The term "pharmaceutically acceptable salts, ethers and esters" includes such derivatives of the free hydroxy sulfones of formula I which do not create any difference in kind of pharmaceutical activity from that shown by the corresponding free phenols. Such derivatives can be used to provide greater solubility or greater ease in formulation than the free phenol. These derivatives do not change the characteristic application of the free phenol but merely facilitate applying or formulating the compounds, for example by increasing solubility.

Exemplary of salts are those wherein the cation is an alkaline metal such as sodium or potassium, ammonium, substituted ammonium such as diethanol ammonium or such metal cations as calcium, aluminum or iron. The designation "salts" is also intended to include complexes that might be formed with the latter metals.

In the same manner, pharmaceutically acceptable ethers of the compounds of formula I include the methyl and ethyl and other lower alkyl ethers including those species substituted with hydroxy groups (e.g., a 2,3-dihydroxypropyl ether) or an amino group (e.g., a diethylaminoethyl ether) and the like. The ether group can even be the above-discussed 3,5-di-T-4-hydroxy moiety, as, for example, in the compound 3,3',5,5'-tetraiodo-2-hydroxy-4'-[3'',5''-diiodo-4''-hydroxy-phenoxy]-diphenylsulfone.

Similarly, pharmaceutically acceptable esters of the compounds of formula I include those derivatives formed from both monocarboxylic acids such as acetates, propionates and butyrates as well as from polycarboxylic acids such as succinates, fumarates and maleates. Esters can also be formed with inorganic acids such as phosphoric and sulfuric acid. In the case of such esters formed from polybasic acids, one or more remaining acid functions can be in the form of pharmaceutically acceptable salts.

It is further to be appreciated that such derivatives may be formed on only one of the phenolic hydroxy groups of the compounds of formula I. Thus, there can be prepared the monoacetate or monomethyl ether leaving a free phenolic group. Similarly, one could also utilize different functional derivatives in a given compound as, for example, a monomethylether-monoacetate. Again, the crux of our invention is the discovery that pharmaceutically acceptable preparations containing a compound having the chemical nucleus specified in formula I can inhibit undesirable blood-platelet aggregation.

The sulfones of formula I can be prepared by various methods known in the art. One such process is the reaction at elevated temperatures of two moles of the corresponding phenol with sulfuric acid as described, for example, in U.S. Pat. No. 3,383,421. Another suitable process is the Friedel-Crafts or thermal condensation of an appropriately substituted phenolsulfonic acid with an appropriately substituted benzene species as described, for example, in U.S. Pat. No. 3,125,604. Still further, the active compounds of the compositions of this invention can be prepared by oxidation of the corresponding bisphenol sulfides, e.g. with hydrogen peroxide. Iodine and bromine can readily be added to the desired diphenysulfone species by conventional iodination and bromination techniques, respectively. In the various preparative reaction sequences, it may be advantageous to form a derivative of one or both phenolic hydroxyl groups to modify reactivity. For example, one of the phenolic hydroxyl groups can be reacted with a phenacyl halide. The ring containing the resultant phenacyl ester will be deactivated and thus halogenation can be effected exclusively in the other ring. The formation and removal of such groups are well known techniques.

The following examples illustrate the preparation of representative compounds for use in the compositions of this invention.

Example 1

3,3',5,5'-tetraiodo-2,4'-dihydroxy-diphenylsulfone

Mix 9.5 g. of 2,4'-dihydroxy-diphenylsulfone, 12.5 g. of sodium acetete and 50 ml. of acetic acid and stir at 75°–80°. Add 24.7 g. of iodine monochloride over 5 minutes maintaining the temperature at 80°–85°. After 1 hour cool and collect the precipitate. Dissolve the precipitate in 2 percent sodium hydroxide solution and acidify with 10 percent hydrochloric acid; collect the solid and dry to give the title compound, m.p. over 300°.

Example 2

3,3',5-triiodo-4,4'-dihydroxy-diphenylsulfone

Dissolve 9.5 g. of 4,4'-dihydroxy-diphenylsulfone in 50 ml. of acetic acid and stir at 75°–80°. Add 18.5 g. of iodine monochloride over 5 minutes maintaining the temperature at 80°–85°. After 1 hour, cool and collect the precipitate. Stir with methanol, filter, and evaporate the filtrate to dryness, wash the solid with hot water, collect and dry to obtain the title compound, m.p. 214°–215°.

Example 3

3,5-diiodo-4,4'-dihydroxy-diphenylsulfone

A solution of 500 mg. of 4-hydroxy-4'-phenacyloxy diphenylsulfone and 221 mg. of sodium acetate in 50 ml. of glacial acetic acid is warmed to 65°. Iodine monochloride, 438 mg., is added to the stirred solution. The temperature is maintained at 85°–90° overnight. The reaction mixture is cooled to room temperature and poured onto an ice water-sodium bisulfite solution. The resulting precipitate is collected, washed with water and dried. Crystallization from ethanol yields the pure title compound, m.p. 211°–214°.

Example 4

3,3'-diiodo-4,4'-dihydroxy-diphenylsulfone

Mix 5.0 g. of 4,4'-dihydroxy-diphenylsulfone, 10.4 g. of iodine and 20.2 g. of morpholine with 20 ml. of methanol and stir at room temperature for four days. Filter the solution and evaporate the filtrate to dryness. The oil solidifies upon addition of chloroform. The solid is collected and dried and dissolved in 5 percent sodium hydroxide solution. Acidify with 10 percent hydrochloric acid and collect the precipitate. Stir this precipitate with hot water and collect the title compound, m.p. 214°.

Example 5

5,5'-diiodo-3,3'-dimethyl-4,4'-dihydroxy-phenylsulfone

Mix 2.54 g. of 3,3'-dimethyl-4,4'-dihydroxydiphenylsulfone, 1.7 g. of sodium acetate and 10 ml of acetic acid and heat to 80°. After a solution is obtained 3.3 g. of iodine monochloride is added over 5 minutes to the hot solution and after 1 hour, the mixture is cooled, filtered, and the solid is washed with water to obtain the title compound, (m.p. over 270°).

Example 6

3,5-dibromo-3',5'-diiodo-4,4'-dihydroxy-diphenylsulfone

Add 1.6 g. of bromine to a stirred slution of 2.5 g. of 4,4'-dihydroxy-3,5-diiodo-diphenylsulfone in 40 ml. of chloroform and reflux overnight. Cool, filter, and wash the solid with cold chloroform to obtain the title compound, m.p. above 280°.

Example 7

3',5',4,6-tetraiodo-3,4'-dihydroxy-diphenylsulfone

Mix 9.5 g. of 3,4'-dihydroxy-diphenylsulfone, 12.5 g. of sodium acetate and 50 ml. of acetic acid and heat and stir at 75°–80°. Add 24.7 g. of iodine monochloride over 5 minutes maintaining the temperature at 80°–85°. After 1 hour at this temperature, cool and filter. Dissolve the solid in 2 percent sodium hydroxide and acidify with 10 percent hydrochloric acid, filter the solid obtained and dry; the title compound is obtained, m.p. over 270°.

Example 8

3,3',5,5'-tetrabromo-2,4'-dihydroxy-diphenylsulfone

Add 3.3 g. of bromine to a stirred mixture of 1.24 g. of 2,4'-dihydroxy-diphenylsulfone in 20 ml. of chloroform and reflux overnight. Cool, filter, and wash the solid with cold chloroform to obtain the title compound, m.p. 267°–268°.

Example 9

2'-methoxy-3,5-diiodo-4-hydroxy-diphenylsulfone

Mix 5.0 g. of 2-methoxy-4'-hydroxydiphenylsulfone, 10.4 g. of iodine, 20.2 g. morpholine, and 20 ml. of methanol and stir at room temperature for 4 days. Filter and evaporate and treat the residue with chloroform. Collect the solid obtained, dissolve in 5 percent sodium hydroxide and precipitate with 10 percent hydrochloric acid. Stir the precipitate obtained with hot water and collect the title compound.

The following examples illustrate conventional acylation and etherification procedures which can be employed to prepare ester and ether derivatives, respectively, of the free phenols of formula I.

Example 10

3,3',5,5'-tetraiodo-4,4'-diacetoxy-diphenylsulfone

Mix 5.0 g. of 4,4'-dihydroxy-3,3',5,5'-tetraiododiphenylsulfone and 20 ml. of acetic anhydride, heat and stir under reflux overnight. Cool and collect the product, wash with 10 ml. of cold ether, dry to obtain the title compound, m.p. over 300°.

Example 11

Dipotassium
3,3',5,5'-tetraiodo-diphenylsulfone-2,4'-disulfate

A mixture of 37.7 g. of 3,3',5,5'-tetraiodo-2,4'-dihydroxy-diphenylsulfone and 26.4 g. of dimethylaniline is heated on a steam bath with stirring and 63.5 g. of potassium pyrosulfate is added. After 4 hours the mixture is poured into a suspension of excess barium oxide in cold water. The base is removed by steam distillation and the excess barium oxide is removed with carbon dioxide. After filtering and evaporating the title compound is isolated.

Example 12

3,3', 5,5'-tetraiodo-4,4'-dimethoxy-diphenylsulfone

Mix 5.0 g. of the disodium salt of 4,4'-dihydroxy-3,3',5,5'-tetraiodo-diphenylsulfone, 30 ml. of methyl iodide, 100 mg. sodium methoxide, and 75 ml. of methanol; heat and stir under reflux for 24 hours. Evaporate the solution to dryness, extract with methylene chloride and chromatograph on silica gel using methylene chloride to obtain the title compound, m.p. over 300°.

Other representative compounds of formula I which may be employed (either as the free phenol or in pharmaceutically acceptable salt, ether or ester form) as the active ingredient in the pharmaceutical compositions of this invention are:

3,3',5,5'-tetrabromo-2,4'-dihydroxy-diphenylsulfone
2,3',5',6-tetrabromo-4,4'-dihydroxy-diphenylsulfone
3,3'-dibromo-5,5'-di-(t-butyl)-4,4'-dihydroxy-diphenylsulfone
3,5-diiodo-3',5'-dimethyl-4,4'-dihydroxy-diphenylsulfone
2',3,4',5,6'-pentabromo-2,3'-dihydroxy-diphenylsulfone
3,3',5,5'-tetraiodo-2,2'-dihydroxy-diphenylsulfone
2,2',4,4'-tetraiodo-3,3'-dihydroxy-diphenylsulfone
3,3'-dibromo-5,5'-diiodo-4,4'-dihydroxy-diphenylsulfone
3,5-dibromo-3,5'-diiodo-2,4'-dihydroxy-diphenylsulfone
2,3',5',6-tetraiodo-3,4'-dihydroxy-diphenylsulfone
3,5-diiodo-3',5'-dichloro-4,4'-dihydroxy-diphenylsulfone
3,3',5-tribromo-4,4'-dihydroxy-diphenylsulfone
2,3',5',6-tetraiodo-4,4'-dihydroxy-diphenylsulfone
3,3',5'-triiodo-5-isopropyl-2,4'-dihydroxy-diphenylsulfone
3,3'-diiodo-5,5'-dimethyl-4,4'-dihydroxy-diphenylsulfone
3,5-diiodo-3',5'-di(t-butyl)-4,4'-dihydroxy-diphenylsulfone
4-chloro-3',5'-dibromo-5-methyl-2,4'-dihydroxy-diphenylsulphone
3,5-diiodo-4'-fluoro-4-hydroxy-diphenylsulfone
3,5-diiodo-5'-trifluoromethyl-2',4-dihydroxy-diphenylsulfone
2'-chloro-3-bromo-5-iodo-5'-methyl-4-hydroxy-phenylsulfone, and
2-methyl-2',4'-dichloro-3,5-dibromo-4-hydroxy-phenylsulfone.

A convenient and quantitative measure of anti-blood platelet aggregation activity may be found in the ability of substance to antagonize the aggregation of platelets in suspension induced by thrombin, adenosin diphosphate (ADP) and collagen. These substances are factors which are believed to play an important part in the blood platelet aggregation process. Erythrocyte sedimentation rate (ESR) values are also believed to correlate well with anti-blood platelet aggregation activity. The active compounds of the compositions of this invention exhibit an ability to antagonize thrombin, ADP and collagen and have ESR values much better than those of other synthetic compounds suggested in the literature for such anti-aggregative activity.

The compositions of this invention can be administered to mammals disposed toward undesirable (excessive) blood platelet aggregation. Individuals can be disposed to hyperthrombotic complications due to surgery, late pregnancy, phlebitis, recent myocardial infarction, and the like. The compositions of this invention are particularly suited for administration to patients who have just had artificial heart valves inserted and therefore face a serious risk of thromboembolism from platelet thrombi. It is also contemplated that the process of this invention can be employed as long term prophylactic treatment of persons disposed to excessive platelet aggregation.

The compositions of this invention can be administered either orally or parenterally. The oral route is preferred for chronic and prophylactic use. Parenteral use is indicated for those excessively prone to acute thromboembolic episodes, and when immediate onset of activity is desired. The daily dosage should be about 2 to 30 mgs. of the active ingredient per kilogram of body weight. In a preferred embodiment, this dosage is administered in a regimen of 3 or 4 spaced divided doses. Each individual dose should contain from about 30 to about 800 mgs. of the active ingredient. In each specific instance, the attending diagnostician will determine the exact dosage, amount and frequency taking into account related health factors of the subject.

For oral use the compounds of this invention can be administered in conventional pharmaceutical doses form, e.g., tablets and capsules. For parenteral use, and especially for intravenous injection, they can be administered simply in a form of a physiological saline solution buffered at about pH 7 to 8. In the formulations of pharmaceutical preparation there can be employed such pharmaceutical diluents which do not react with the compounds, as for example, water, gelatin, lactose, starches, magnesium stearate, talc, vegetable oils, benzyl alcohols, gums, polyalkylene glycols, and petroleum jelly.

An illustrative pharmaceutical preparation according to this invention is as follows:

EXAMPLE

100 Mg. Tablets

Mix 100 grams of the disodium salt of 3,3',5,5'-tetraiodo-2,4'-dihydroxy-diphenyl sulfone, 50 grams of powdered sugar, and 90 grams of corn starch and granulate with a 10 percent gelatin solution. Dry the granulation and reduce to uniform granules for tableting. Add 45 grams of corn starch (as disintegrant) and about 1 percent of magnesium stearate (as lubricant). Compress the mixture to a weight of 300 mg. per tablet on a single punch or rotary machine, using 7/16 inch punch.

Numerous variations of the above-described compositions and methods within the spirit of this invention will be apparent to one skilled in the art.

We claim
1. A pharmaceutical preparation in dosage unit form adopted for administration to obtain an inhibitory effect on blood platelet aggregation comprising, per dosage unit, a non-hemolytic amount within the range of from about 30 to about 800 milligrams of a phenol of the formula:

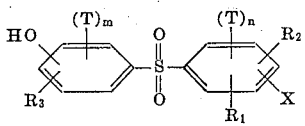

wherein each T is independently iodine or bromine and $m$ has a value of 1 or 2 and $n$ has a value of 0, 1 or 2 with the proviso that $m + n$ is at least 2 and $m$ is at least equal to $n$; X is hydroxy or halogen and $R_1$, $R_2$ and $R_3$ are independently selected from the group consisting of hydrogen, halogen, trifluoromethyl and alkyl radicals having 1 to 4 carbon atoms; and pharmaceutically acceptable derivatives of the phenolic hydroxy moieties selected from the group consisting of salts, lower alkyl ethers and esters of monocarboxylic acids, polycarboxylic acids, phosphoric acid or sulfuric acid; in a pharmaceutical diluent.

2. A pharmaceutical preparation in accordance with claim 1 in a solid dosage form.

3. A pharmaceutical preparation in accordance with claim 2 in the form of a tablet.

4. A pharmaceutical preparation in accordance with claim 1 wherein said compound is present in the form of a water-soluble pharmaceutically acceptable salt.

5. A pharmaceutical preparation in accordance with claim 1 wherein each T is iodine.

6. A pharmaceutical preparation in accordance with claim 1 wherein each T is bromine.

7. A pharmaceutical preparation in accordance with claim 6 wherein $m$ and $n$ each have a value of 2.

8. A pharmaceutical preparation according to claim 1 wherein said phenol is of the formula

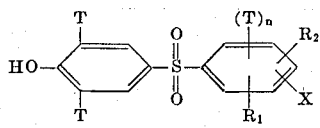

wherein each T is independently iodine or bromine, $n$ has a value of 0, 1 or 2; X is hydroxy or halogen and $R_1$ and $R_2$ are independently selected from the group consisting of hydrogen, halogen, trifluoromethyl and alkyl radicals having 1 to 4 carbon atoms; and the pharmaceutically acceptable derivatives of the phenolic hydroxy moieties selected from the group consisting of salts, lower alkyl ethers and esters of monocarboxylic acids, polycarboxylic acids, phosphoric acid or sulfuric acid.

9. A pharmaceutical preparation in accordance with claim 1 wherein said compound is present in the form of its disodium salt.

10. A pharmaceutical preparation in accordance with claim 8 wherein each T is iodine.

11. A pharmaceutical preparation in accordance with claim 1 wherein said compound is the disodium salt of 3,3',5,5'-tetraiodo-2,4'-dihydroxy-diphenylsulfone.

12. A pharmaceutical preparation in accordance with claim 1 wherein said compound is the disodium salt of 3,3',5-triiodo-4,4'-dihydroxy-diphenylsulfone.

13. A method of producing an inhibitory effect on blood platelet aggregation comprising administering to an individual disposed toward undesirable blood platelet aggregation, a pharmaceutical preparation comprising a non-hemolytic, effective amount of a phenol of the formula:

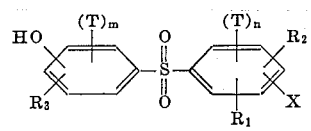

wherein each T is independently iodine or bromine and $m$ has a value of 1 or 2 and $n$ has a value of 0, 1 or 2 with the proviso that $m + n$ is at least equal to $n$; X is hydroxy or halogen and $R_1$, $R_2$ and $R_3$ are independently selected from the group consisting of hydrogen, halogen and alkyl radicals having 1 to 4 carbon atoms and pharmaceutically acceptable derivatives of the phenolic hydroxy moieties selected from the group consisting of salts, lower alkyl ethers and esters of monocarboxylic acids, polycarboxylic acids, phosphoric acid or sulfuric acid; in a pharmaceutical diluent.

14. A method in accordance with claim 13 wherein said compound is present in the form of a water-soluble pharmaceutically acceptable salt.

15. A method in accordance with claim 13 wherein said phenol is of the formula

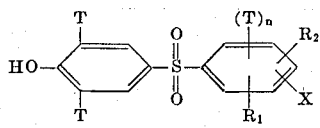

wherein each T is independently iodine or bromine and $n$ has a value of 0, 1 or 2; X is hydroxy or halogen and $R_1$ and $R_2$ are independently selected from the group consisting of hydrogen, halogen, trifluoromethyl and alkyl radicals having 1 to 4 carbon atoms; and the pharmaceutically acceptable derivatives of the phenolic hydroxy moieties selected from the group consisting of salts, lower alkyl ethers and esters of monocarboxylic acids, polycarboxylic acids, phosphoric acid or sulfuric acid.

16. A method in accordance with claim 15 wherein each T is iodine.

17. A method in accordance with claim 13 wherein said compound is the disodium salt of 3,3',5,5'-tetraiodo-2,4'-dihydroxy-diphenylsulfone.

18. A method in accordance with claim 13 wherein said compound is the disodium salt of 3,3',5-triiodo-4,4'-dihydroxy-diphenylsulfone.

19. A method in accordance with claim 13 wherein the amount of said compound is within the range of from about 2 to 30 mgs./kg. of body weight per day.

20. A method in accordance with claim 13 wherein the amount of said compound in each single administration is within the range of from about 30 to 800 mgs.

21. A method in accordance with claim 13 wherein said pharmaceutically acceptable preparation is administered orally.

22. A method in accordance with claim 13 wherein said pharmaceutically acceptable preparation is administered intravenously.

* * * * *